United States Patent
Dutta et al.

(10) Patent No.: US 8,350,900 B2
(45) Date of Patent: Jan. 8, 2013

(54) COLOR ANAGLYPH IMAGE GENERATION TO REDUCE EYE STRAIN AND RETINAL RIVALRY UPON VIEWING

(75) Inventors: Santanu Dutta, Sunnyvale, CA (US); Gerrit Ary Slavenburg, San Jose, CA (US); David R Cook, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 627 days.

(21) Appl. No.: 12/637,767

(22) Filed: Dec. 15, 2009

(65) Prior Publication Data

US 2011/0141240 A1    Jun. 16, 2011

(51) Int. Cl.
*H04N 13/02* (2006.01)
(52) U.S. Cl. ............................. 348/60; 348/47
(58) Field of Classification Search .................... 348/47, 348/60
See application file for complete search history.

(56) References Cited

U.S. PATENT DOCUMENTS 4,734,756 A * 3/1988 Butterfield et al. ............. 348/43
2005/0117637 A1* 6/2005 Routhier et al. ......... 375/240.01

* cited by examiner

*Primary Examiner* — Sath V Perungavoor
*Assistant Examiner* — Jeffery Williams
(74) *Attorney, Agent, or Firm* — Raj Abhyanker, P.C.

(57) ABSTRACT

A method includes reducing a red rivalry through adjusting a color temperature on a first image, converting the first image from the RGB domain to a YCbCr domain, shifting a hue of a red color in the first image towards a magenta color to reduce a red color vibrancy, and adjusting a blue color in the first image such that a dark blue visible through a second lens corresponding to a second image is at least partially visible through a first lens corresponding to the first image. The method also includes reducing the red rivalry through adjusting a tone of the red color in the first image towards a brown color, converting the first image from the YCbCr domain back to the RGB domain, adjusting a color saturation in the first image, and combining the first image with the second image in a processor to generate an anaglyph image.

20 Claims, 5 Drawing Sheets

COLOR ANAGLYPH IMAGE GENERATION TO REDUCE EYE STRAIN AND RETINAL RIVALRY UPON VIEWING

FIELD OF TECHNOLOGY

This disclosure relates generally to anaglyph images and, more particularly, to a method, an apparatus, and a system for generating anaglyph images with improved color and reduced eye strain and retinal rivalry upon viewing the anaglyph images.

BACKGROUND

Stereoscopic three-dimensional (3D) effects may be obtained through anaglyph images viewed with appropriate 3D anaglyph glasses. Each lens of the 3D anaglyph glasses may be of a color chromatically opposite to that of the other lens. For example, the chromatically opposite colors may be red and blue. In an anaglyph image, two mildly differing perspectives of the same subject may be superimposed on one another in the aforementioned chromatically opposite colors. The two color layers may be offset with respect to each other to produce a depth effect. The main subject may be in the center, while the foreground and the background may be shifted laterally in opposite directions.

For example, when viewing an anaglyph through appropriate 3D anaglyph glasses, the left eye may perceive the true white or true black areas of the anaglyph image the same way as the right eye, whose corresponding lens is of a chromatically opposite color to that of the left eye lens. The left eye, when covered by the red filter, may perceive the red and blue parts of the image as "white" and "black" respectively, and the opposite effect may be perceived by the right eye.

A method of producing monochromatic/grayscale anaglyph images from an input stereo pair of colored images may include converting the stereo pair to grayscale and then obtaining the final anaglyph image by using the red channel of the left grayscale image and the green and blue channels of the right grayscale image. A method of producing color anaglyph images may include combining the red channel of the left color image and the green and blue channels of the right color image to obtain the final anaglyph image. No intermediate grayscale production may be required.

The problems associated with regular color anaglyph images generated using the aforementioned method may include saturated colors not being portrayed well, certain color intensities and hues (e.g., bright red and blue) causing eye strain after sustained use, color leaks between the left eye and the right eye, brightness and contrast differences between the left and right images, discomfort caused by retinal rivalry, and ghosting due to the color leaks. Ghosting may cause an unintended portion of the image destined for one eye to be seen by the other eye.

Methods to alleviate the abovementioned problems associated with the typical method of anaglyph image generation may include utilizing grayscale anaglyph images, half-color anaglyph images, and/or optimized anaglyph images. Utilizing grayscale images alone may lead to less eye strain and retinal rivalry. However, they may trade color for comfort. Half-color anaglyph images utilize grayscale images for the left eye and blue and green images for the right eye. However, they reduce retinal rivalry at the expense of, again, color. Generating optimized anaglyph images may involve leaving most of the red channel from the original image unutilized. This may eliminate retinal rivalry at the expense of having no red colors (i.e., reduced color).

SUMMARY

Disclosed are a method, an apparatus, and a system for generating anaglyph images with improved color and reduced eye strain and retinal rivalry upon viewing the anaglyph images.

In one aspect, a method includes reducing a red rivalry through adjusting a color temperature on a first image of a stereo Red Green Blue (RGB) image pair including the first image and a second image to change a global illumination, converting the first image from the RGB domain to a YCbCr domain, shifting a hue of a red color in the first image towards a magenta color to reduce a vibrancy of the red color, and adjusting a blue color in the first image such that a dark blue visible through a second lens corresponding to the second image is at least partially visible through a first lens corresponding to the first image.

The method also includes reducing the red rivalry through adjusting a tone of the red color in the first image towards a brown color, converting the first image from the YCbCr domain back to the RGB domain, adjusting a color saturation in the first image to reduce a color imbalance, and combining the first image with the second image in a processor to generate an anaglyph image.

In another aspect, a method of reducing eye strain of a first stereo image of a stereo RGB image pair includes adjusting, in a processor, a contrast of the first stereo image based on a transmittance of a first lens corresponding to the first stereo image to improve the contrast of the first stereo image, reducing a global retinal rivalry of a red color through shifting a white point in the first stereo image according to a color temperature adjustment to change a global illumination, and converting the first stereo image from the RGB domain to the YCbCr domain.

The method also includes shifting a hue of the red color in the first stereo image towards a magenta color to reduce a vibrancy of the red color, adjusting a blue color in the first stereo image such that a dark blue visible through a second lens corresponding to a second stereo image of the stereo RGB image pair is at least partially visible through the first lens, and reducing the retinal rivalry of the red color in the first stereo image through adjusting a tone of the red color towards a brown color.

Further, the method includes converting the first stereo image from the YCbCr domain back to the RGB domain to display the first stereo image, and adjusting a color saturation in the first stereo image to reduce a color imbalance.

In yet another aspect, a system of generating an anaglyph image includes a stereo RGB image pair including a first image and a second image, a first lens including a first color filter to view the first image, a second lens including a second color filter to view the second image, and a processor. The second color filter is different from the first color filter. The processor is configured to adjust a color temperature on the first image and the second image to change a global illumination and to reduce a red rivalry, convert the first image and the second image from the RGB domain to a YCbCr domain, and shift a hue of a red color in the first image towards a magenta color to reduce a vibrancy of the red color.

The processor is also configured to shift a hue of a blue color in the second image to maintain a yellow color and to reduce a deep blue rivalry, adjust a green color in the second image to enhance the green color, adjust a blue color in the first image such that a dark blue visible through the second lens is at least partially visible through the first lens, and adjust the blue color in the second image such that a bright blue color is shifted towards a dark blue color to reduce eye strain.

Further, the processor is configured to adjust a tone of the red color in the first image towards a brown color to reduce the red rivalry, convert the first image and the second image from the YCbCr domain back to the RGB domain, adjust a color saturation in the first image and the second image to reduce a color imbalance, and combine the first image with the second image to generate the anaglyph image.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system, and an apparatus for generating anaglyph images with improved color and reduced eye strain and retinal rivalry upon viewing the anaglyph images. Although the present embodiments have been described with reference to specific example embodiments, it will be evident that various modifications and changes may be made to these embodiments without departing from the broader spirit and scope of the various embodiments.

Figure 1:
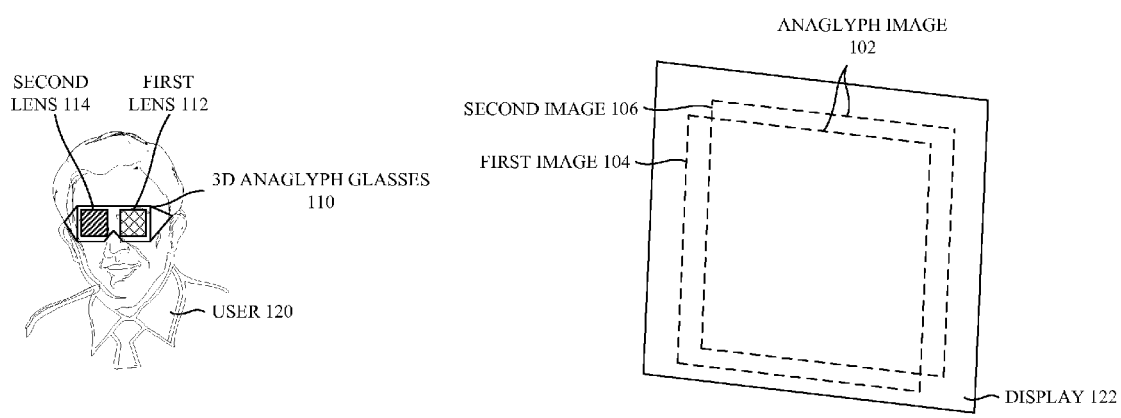
FIG. 1 is a diagrammatic view of an anaglyph image viewed through appropriate 3D anaglyph glasses of a user, according to one or more embodiments

FIG. 1 shows an anaglyph image 102 viewed through appropriate 3D anaglyph glasses 110 of a user 120, according to one or more embodiments. In one or more embodiments, the 3D anaglyph glasses 110 may include a first lens 112 and a second lens 114 configured to present a combination of a first image 104 corresponding to the first lens 112 in a left-eye view and a second image 106 corresponding to the second lens 114 in a right-eye view in the unified two-eye view. In one or more embodiments, the anaglyph image 102 may be viewed on a display 122 (e.g., a computer monitor, a movie screen, an imaging display), as shown in FIG. 1, or may be a photograph.

Figure 2:
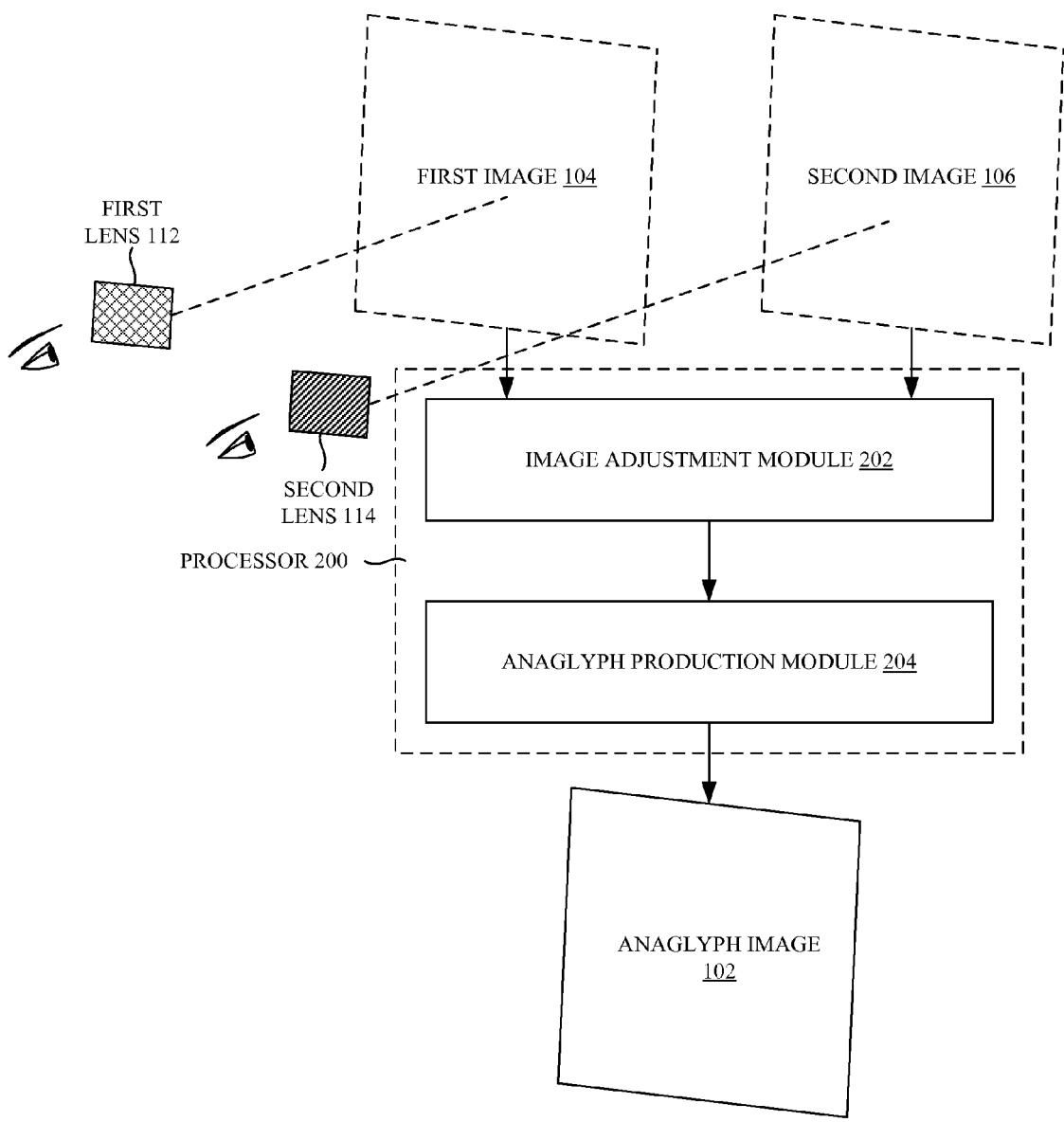
FIG. 2 is a system view of a generation of the anaglyph image of FIG. 1, according to one or more embodiments.

FIG. 2 shows the generation of the anaglyph image 102 of FIG. 1, according to one or more embodiments. Here, the first image 104 and second image 106 are shown as a distinct left-eye view and a right-eye view respectively. In one or more embodiments, although the user 120 may actually view an anaglyph image, separate images (i.e., the first image 104 and the second image 106) exclusive to the left eye/right eye are shown in FIG. 1 to distinguish between the left-eye view and the right-eye view. In one or more embodiments, the first image 104 and the second image 106 may be processed through a processor 200 (e.g., a Graphics Processing Unit (GPU)) to generate the anaglyph image 102 of FIG. 1, as shown in FIG. 2. In one or more embodiments, the processor 200 may include an image adjustment module 202 and an anaglyph production 204 module, which may perform some or all of the operations discussed below. In one or more embodiments, the generated anaglyph image 102 may provide for reduced eye strain and retinal rivalry upon viewing as will be discussed below.

In one or more embodiments, the first image 104 and the second image 106 may be Red Green Blue (RGB) left and right stereo pair images. In one or more embodiments, firstly, the contrast of the first image 104 and/or the second image 106 may be enhanced based on the transmittances of the first lens 112 and the second lens 114 respectively. In one or more embodiments, the lens transmittances may be determined by photometric techniques. In one or more embodiments, programmable dim-factors based on the transmittances of the first lens 112 and/or the second lens 114 may be utilized by the processor 200 to enhance the contrast of the first image 104 and/or the second image 106.

In one or more embodiments, a programmable dim-factor may, for example, dim every other row of the first image 104 and/or the second image 106 based on the transmittances of the first lens 112 and the second lens 114. In one or more embodiments, the programmable dim-factors and the lens transmittances may be utilized to "balance" light between the left-eye and the right-eye, i.e., to ensure that one eye does not receive more light than the other eye. In one or more embodiments, the programmable dim-factor may be varied, for example, from 0 to 1. In one or more embodiments, a dim-factor lesser than 1 may reduce contrast.

In one or more embodiments, the contrast enhancement may also include equalization of brightness levels in the individual first image 104 and/or the second image 106. The aforementioned processing may improve contrasts of the first image 104 and/or the second image 106.

In one or more embodiments, following the contrast enhancement, the color temperature on the first image 104 and/or the second image 106 may be adjusted to change the global illumination of the prospective combination of the first image 104 and the second image 106. In one or more embodiments, the color temperature on the first image 104 and/or the second image 106 may be determined based on a comparison between a respective chromaticity thereof and an ideal blackbody radiator. In one or more embodiments, a white point shift on the first image 104 and/or the second image 106 according to the color temperature adjustment may be utilized to change the global illumination. In one or more embodiments, the global illumination may not only take into account the direct light from the light source but also the indirect light from the light source as an effect of reflection by other surfaces in the 3D "scene."

In one or more embodiments, the global illumination may be changed through a global illumination algorithm utilized by the processor 200 (specifically, the image adjustment module 202). In one or more embodiments, the global illumination algorithm may utilize a gamut-mapping matrix to change the global illumination. In one or more embodiments, the change in the global illumination may provide for reduced global red rivalry.

In one or more embodiments, the first image 104 and the second image 106 may then be converted from the RGB domain to the YCbCr domain to reduce mutual redundancy between R, G, and B signals associated with representation in the RGB domain. In one or more embodiments, the conversion from the RGB domain to the YCbCr domain may be accomplished through a mathematical transformation performed using the processor 200.

Following the conversion from the RGB domain to the YCbCr domain, the hue of a red color of the first image 104 may be shifted on the Cb-Cr chroma plane (see Cb-Cr plane 300 of FIG. 3) towards a magenta color to reduce most of the vibrant red. In one or more embodiments, the hue of a blue color of the second image 106 may be shifted on the Cb-Cr chroma plane (see Cb-Cr plane 300 of FIG. 3) to reduce a bit of the deep blue rivalry without sacrificing yellow. In one or more embodiments, in order to accomplish these, the corresponding red color-difference signal (Cr) and the blue color-difference signal (Cb) may be rotated by different amounts on the Cb-Cr chroma plane (see Cb-Cr plane 300 of FIG. 3). In one or more embodiments, the Y signal may be the luma signal, to which Green (G) is the largest contributor. In one or more embodiments, the difference between the Red (R) signal and the Y signal may be the red color-difference signal (Cr), and the difference between the Blue (B) signal and the Y signal may be the blue color-difference signal (Cb).

In one or more embodiments, the aforementioned rotation of the color-difference signals on the Cb-Cr plane 300 (i.e., the warping of the chroma plane) may help reduce eye strain by changing certain hues while preserving other hues that may not require change. In one or more embodiments, a differential gain may be applied to the first image 104 and/or the second image 106 to allow for light balancing (i.e., brightness balancing) in the left eye and the right eye. In one or more embodiments, the differential gain may be applied to modify the amplitude of a color signal in the first image 104 and/or the second image 106.

In one or more embodiments, a selective range of green colors in the second image 106 may be enhanced using a smooth correction signal. In one or more embodiments, the smooth correction signal may be non-zero in a quadrant (e.g., $3^{rd}$ quadrant in FIG. 3) on the Cb-Cr plane 300 (see FIG. 3) that corresponds to the green color. In one or more embodiments, this may allow for resurrection of the range of green colors that may have been muted during the previous operations described above.

In one or more embodiments, a selective range of blue colors in the second image 106 may be adjusted using a smooth correction signal. In one or more embodiments, the smooth correction signal may be non-zero in portions of the quadrants (e.g., $4^{th}$ quadrant and a portion of the $1^{st}$ quadrant) on the Cb-Cr plane 300 corresponding to the blue color. In one or more embodiments, this may allow for shifting of a problematic range of bright blue colors towards a range of non-problematic dark blue colors. In one or more embodiments, the aforementioned shifting may lead to lowering of eye strain and retinal rivalry.

In one or more embodiments, a blue color in the first image 104 may be adjusted such that a dark blue color visible through the second lens 114 may be at least partially visible through the first lens 112. Therefore, in one or more embodiments, the blue luminance in both the eyes may be adjusted. In one or more embodiments, this may reduce eye strain. In one or more embodiments, in order to accomplish the aforementioned visibility of the dark blue color through the first lens 112, the blue color in the first image 104 may be adjusted corresponding to shift locations in the second image 106.

In one or more embodiments, a specific range of red colors may be toned down in the first image 104 to eliminate residual red rivalry. In one or more embodiments, this may involve adjusting a tone of the red color of the first image 104 towards a brown color. In one or more embodiments, the aforementioned red fix in the first image 104 may be done for the selective range of red colors using a smooth correction signal that may be non-zero in a selected region of the quadrant (e.g., $2^{nd}$ quadrant) on the Cb-Cr plane 300 corresponding to the red color.

In one or more embodiments, the first image 104 and the second image 106 may be converted back to the RGB domain. In one or more embodiments, this may be accomplished through a mathematical transformation (e.g., an inverse of the mathematical transform used in the RGB domain to YCbCr domain conversion) performed using the processor 200. In one or more embodiments, the conversion back to the RGB domain may enable display of the first image 104 and the second image.

In one or more embodiments, a color saturation of the first image 104 and the second image 106 may be controlled using special eye weights (i.e., left eye weights and right eye weights) to reduce color imbalance. In addition, in one or more embodiments, programmable switching between grayscale, half-color and full-color anaglyph images 102 may be enabled. In one or more embodiments, the anaglyph images 102 may be optimized using the abovementioned operations to reduce eye strain due to retinal rivalry.

In one or more embodiments, a programmable anti-ghosting may also be implemented. In one or more embodiments, the first image 104 and the second image 106 may be combined to produce the anaglyph image 102. In one or more embodiments, most of the operations described above may be performed using the image adjustment module 202. In one or more embodiments, the first image 104 and the second image 106 may be combined at the anaglyph production module 204 to generate the anaglyph image 102.

In one or more embodiments, the abovementioned operations may be implemented predominantly as a sequence of collapsible/combinable affine transforms. In one or more embodiments, the affine transforms may be mapped to a sparse 3D look-up table that allows simple pixel operations. In one or more embodiments, the aforementioned pixel operation may include a table look-up followed by a bilinear interpolation.

In one or more embodiments, an algorithm implementing the operations described above may be scalable with respect to the available shader power in, for example, a GPU. In one or more embodiments, on a GPU having fewer processors (e.g., streaming multiprocessors (SMs)), the contrast enhancement operation may be eliminated and the remaining sequence of operations mapped to an ordered set of matrix multiplications. In one or more embodiments, on a GPU having a larger number of processors (e.g., SMs), a more sophisticated contrast and color enhancement algorithm may be implemented, along with an image histogram analysis as a pre-processing operation that may be used to derive the gain factors and improve the color stretches utilized in the color processing algorithm.

In one or more embodiments, an algorithm including the above-mentioned operations may be implementable in terms of simple shader operations, and may be scalable with respect to GPU computing power. In one or more embodiments, the superior method of generating anaglyph images 102 described above may enable a user to watch movies (e.g., movies over the Internet, movies on a display 122), play games, and/or view images with minimal eye strain arising out of retinal rivalry and ghosting.

Figure 3:
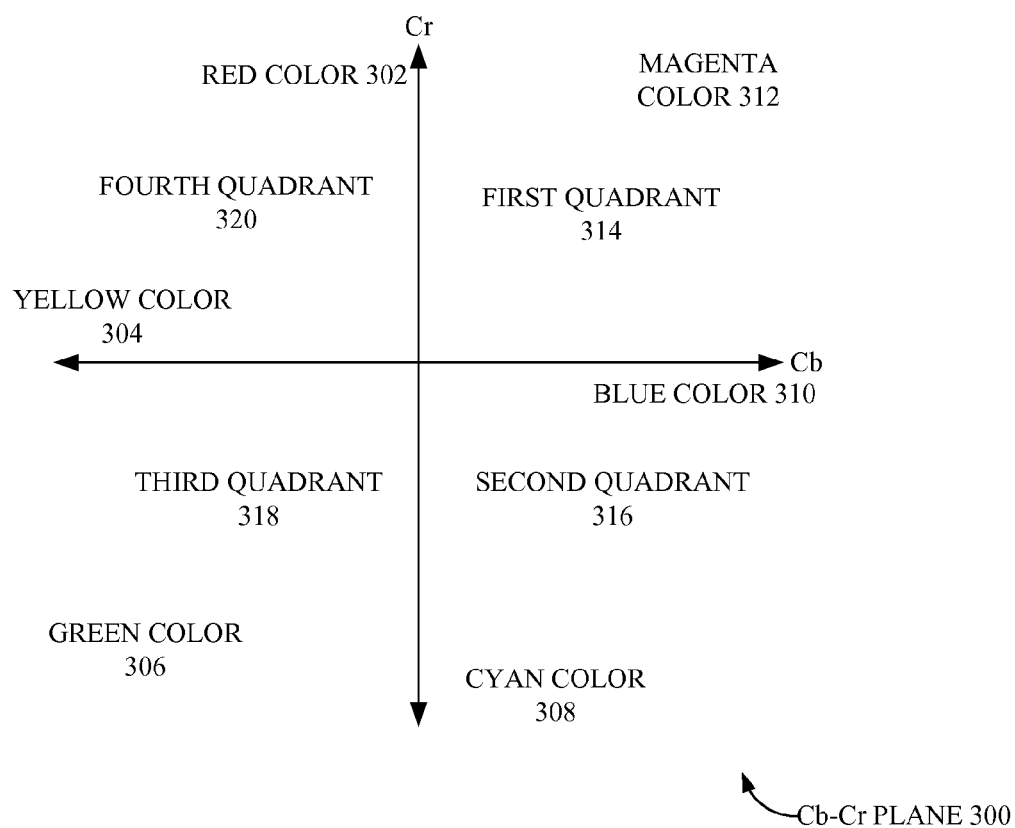
FIG. 3 is a plot of the Cb-Cr plane 300, according to one or more embodiments.

FIG. 3 shows a Cb-Cr plane 300, according to one or more embodiments. In one or more embodiments, the first quadrant 314 may encompass colors starting from a range of magenta colors 312 to a blue color 310. In one or more embodiments, the second quadrant 316 may encompass colors starting from the blue color 310 to a cyan color 308. In one or more embodiments, the third quadrant 318 may encompass colors starting from a range of green colors 306 to a yellow color 304. In one or more embodiments, the fourth quadrant 320 may encompass colors starting from the yellow color 304 to a red color 302. It is obvious that the quadrants may be labeled in either a clockwise order or an anticlockwise order and that the first quadrant 314 may be chosen from four possible choices on the Cb-Cr plane 300. Also, in one or more embodiments, the position of the colors and the specific colors seen may change with movement on the Y (luminance) axis perpendicular to the Cb-Cr plane 300 (i.e., YCbCr plane), and the position of the colors in FIG. 3 is valid merely for a particular Y position.

Figure 4:
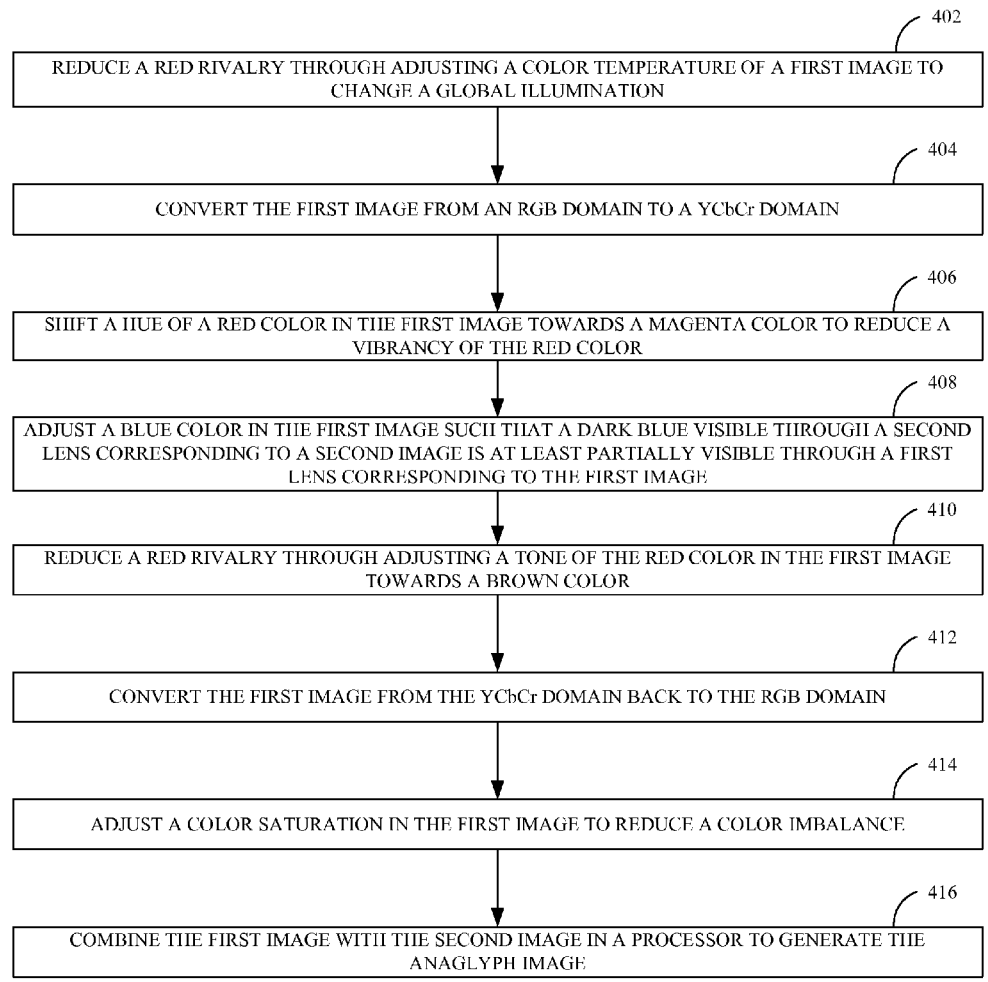
FIG. 4 is a process flow diagram detailing the operations involved in a method of generating an anaglyph image, according to one or more embodiments.

FIG. 4 shows a process flow diagram detailing the operations involved in a method of generating an anaglyph image 102, according to one or more embodiments. In one or more embodiments, operation 402 may involve reducing a red rivalry through adjusting a color temperature of the first image 104 to change a global illumination. In one or more embodiments, the first image 104 may form a stereo RGB image pair with a second image 106. In one or more embodiments, operation 404 may involve converting the first image 104 from the RGB domain to a YCbCr domain.

In one or more embodiments, operation 406 may involve shifting a hue of a red color in the first image 104 towards a magenta color to reduce the vibrancy of the red color. In one or more embodiments, operation 408 may involve adjusting a blue color in the first image 104 such that a dark blue visible through a second lens 114 corresponding to a second image 106 is at least partially visible through a first lens 112 corresponding to the first image 104.

In one or more embodiments, operation 410 may involve reducing a red rivalry through adjusting a tone of the red color in the first image 104 towards a brown color. In one or more embodiments, operation 412 may involve converting the first image 104 from the YCbCr domain back to the RGB domain. In one or more embodiments, operation 414 may involve adjusting a color saturation in the first image 104 to reduce a color imbalance. In one or more embodiments, operation 416 may involve combining the first image 104 with the second image 106 in a processor 200 to generate the anaglyph image 102.

Figure 5:
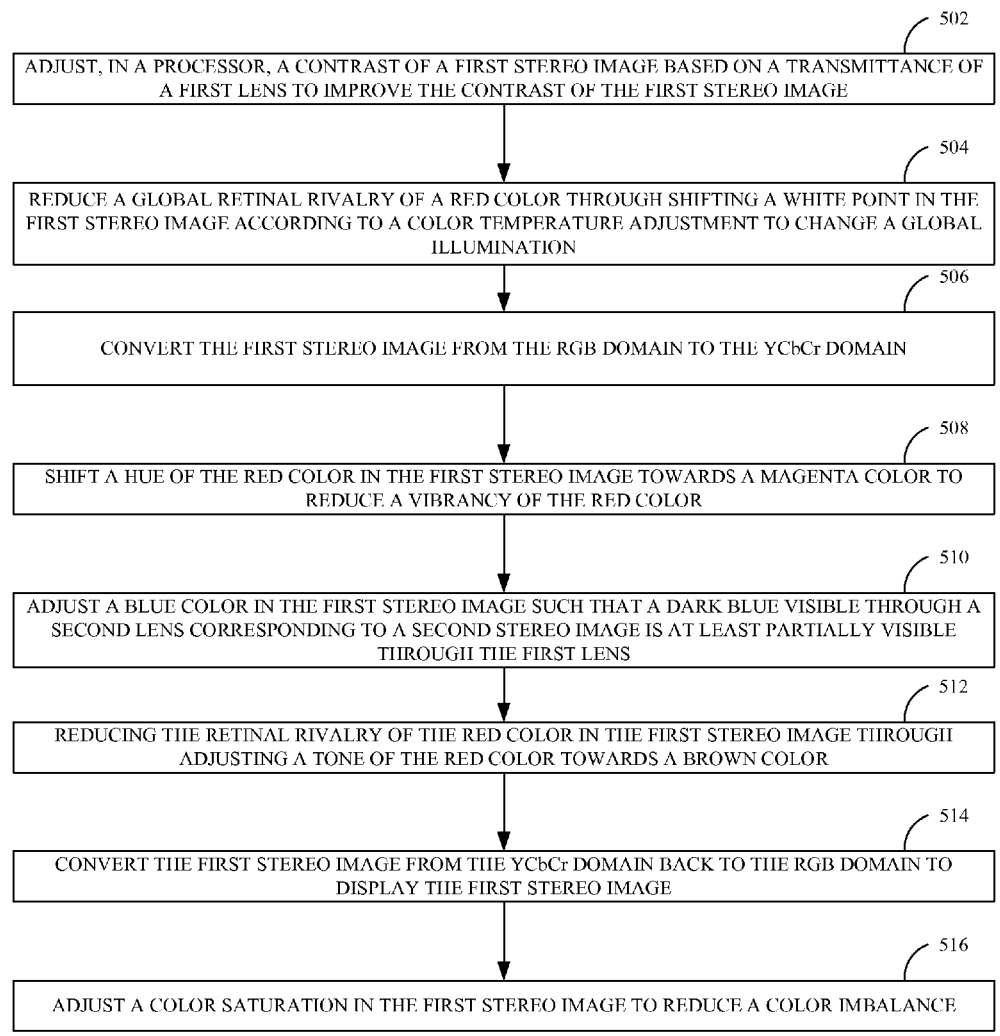
FIG. 5 is a process flow diagram detailing the operations involved in a method of reducing eye strain of a first stereo image of a stereo Red Green Blue (RGB) image pair, according to one or more embodiments.

FIG. 5 shows a process flow diagram detailing the operations involved in a method of reducing eye strain of a first stereo image (e.g., first image 104) of a stereo RGB image pair, according to one or more embodiments. In one or more embodiments, operation 502 may involve adjusting, in a processor 200, a contrast of the first stereo image based on a transmittance of a first lens 112 to improve the contrast of the first stereo image. In one or more embodiments, the first stereo image and a second stereo image (e.g., second image 106) may form the stereo RGB image pair. In one or more embodiments, operation 504 may involve reducing a global retinal rivalry through shifting a white point in the first stereo image according to a color temperature adjustment to change a global illumination.

In one or more embodiments, operation 506 may involve converting the first stereo image from the RGB domain to the YCbCr domain. In one or more embodiments, operation 508 may involve shifting a hue of the red color in the first stereo image towards a magenta color to reduce a vibrancy of the red color. In one or more embodiments, operation 510 may involve adjusting a blue color in the first stereo image such that a dark blue visible through a second lens 114 corresponding to the second stereo image is at least partially visible through the first lens 112.

In one or more embodiments, operation 512 may involve reducing the retinal rivalry of the red color in the first stereo image through adjusting a tone of the red color towards a brown color. In one or more embodiments, operation 514 may involve converting the first stereo image from the YCbCr domain back to the RGB domain to display the first stereo image. In one or more embodiments, operation 516 may involve adjusting a color saturation in the first stereo image to reduce a color imbalance.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative rather than a restrictive sense.

What is claimed is:

1. A method comprising:
reducing a red rivalry through adjusting a color temperature on a first image of a stereo Red Green Blue (RGB) image pair comprising the first image and a second image to change a global illumination;
converting the first image from the RGB domain to a YCbCr domain;
shifting a hue of a red color in the first image towards a magenta color to reduce a vibrancy of the red color;
adjusting a blue color in the first image such that a dark blue visible through a second lens corresponding to the second image is at least partially visible through a first lens corresponding to the first image;
reducing the red rivalry through adjusting a tone of the red color in the first image towards a brown color;
converting the first image from the YCbCr domain back to the RGB domain;
adjusting a color saturation in the first image to reduce a color imbalance; and
combining the first image with the second image in a processor to generate an anaglyph image.

2. The method of claim 1, further comprising:
reducing the red rivalry through adjusting a color temperature on the second image to change the global illumination;

converting the second image from the RGB domain to the YCbCr domain;

reducing a deep blue rivalry through shifting a hue of a blue color in the second image to maintain a yellow color;

adjusting a green color in the second image to enhance the green color;

adjusting the blue color in the second image such that a bright blue color is shifted towards a dark blue color to reduce eye strain and retinal rivalry;

converting the second image from the YCbCr domain back to the RGB domain; and adjusting a color saturation of the second image to reduce a color imbalance.

3. The method of claim 2, further comprising enhancing a contrast of the first image and the second image based on a transmittance of the corresponding first lens and a transmittance of the corresponding second lens prior to reducing the red rivalry through adjusting color temperatures thereof.

4. The method of claim 2, further comprising applying a differential gain to at least one of the first image and the second image to balance a brightness of the first image and the second image.

5. The method of claim 2, comprising shifting the hue of the red color in the first image and the blue color in the second image on a chroma plane such that a red color-difference signal and a blue color-difference signal are rotated by different amounts on the chroma plane.

6. The method of claim 2, comprising adjusting the green color in the second image through a first correction signal that is finite in a quadrant of a Cb-Cr plane corresponding to the green color.

7. The method of claim 2, comprising adjusting the color saturation of the first image and the second image with at least one eye weight corresponding to the first lens and the second lens.

8. The method of claim 2, comprising adjusting the color saturation of the first image and the second image to enable generation of one of a grayscale anaglyph, a half-color anaglyph, and a full-color anaglyph.

9. The method of claim 2, further comprising adjusting at least one of the first image and the second image to reduce ghosting.

10. The method of claim 3, comprising enhancing the contrast of the first image and the second image through a programmable dim-factor based on the transmittance of the first lens and the second lens.

11. The method of claim 6, comprising adjusting the blue color in the second image through a second correction signal that is finite in at least a portion of at least one quadrant of the Cb-Cr plane corresponding to the blue color to shift the bright blue color towards the dark blue color.

12. The method of claim 11, comprising adjusting the tone of the red color in the first image through a third correction signal that is finite in at least a portion of a quadrant of the Cb-Cr plane corresponding to the red color.

13. A method of reducing eye strain of a first stereo image of a stereo RGB image pair comprising:

adjusting, in a processor, a contrast of the first stereo image based on a transmittance of a first lens corresponding to the first stereo image to improve the contrast of the first stereo image;

reducing a global retinal rivalry of a red color through shifting a white point in the first stereo image according to a color temperature adjustment to change a global illumination;

converting the first stereo image from the RGB domain to the YCbCr domain;

shifting a hue of the red color in the first stereo image towards a magenta color to reduce a vibrancy of the red color;

adjusting a blue color in the first stereo image such that a dark blue visible through a second lens corresponding to a second stereo image of the stereo RGB image pair is at least partially visible through the first lens;

reducing the retinal rivalry of the red color in the first stereo image through adjusting a tone of the red color towards a brown color;

converting the first stereo image from the YCbCr domain back to the RGB domain to display the first stereo image; and adjusting a color saturation in the first stereo image to reduce a color imbalance.

14. The method of claim 13, further comprising shifting the hue of the red color in the first stereo image and a hue of a blue color in the second stereo image on a chroma plane such that a red color-difference signal and a blue color-difference signal are rotated by different amounts on the chroma plane.

15. The method of claim 13, comprising adjusting the tone of the red color in the first stereo image through a correction signal that is finite in at least a portion of a quadrant of a Cb-Cr plane corresponding to the red color.

16. A system of generating an anaglyph image comprising:

a stereo RGB image pair comprising a first image and a second image;

a first lens comprising a first color filter to view the first image;

a second lens comprising a second color filter to view the second image, the second color filter being different from the first color filter; and a processor configured to:

adjust a color temperature on the first image and the second image to change a global illumination and to reduce a red rivalry, convert the first image and the second image from the RGB domain to a YCbCr domain, shift a hue of a red color in the first image towards a magenta color to reduce a vibrancy of the red color, shift a hue of a blue color in the second image to maintain a yellow color and to reduce a deep blue rivalry, adjust a green color in the second image to enhance the green color, adjust a blue color in the first image such that a dark blue visible through the second lens is at least partially visible through the first lens, adjust the blue color in the second image such that a bright blue color is shifted towards a dark blue color to reduce eye strain, adjust a tone of the red color in the first image towards a brown color to reduce the red rivalry, convert the first image and the second image from the YCbCr domain back to the RGB domain, adjust a color saturation in the first image and the second image to reduce a color imbalance, and combine the first image with the second image to generate the anaglyph image.

17. The system of claim 16, wherein the processor is configured to shift the hue of the red color in the first image and the hue of the blue color in the second image on a chroma plane such that a red color-difference signal and a blue color-difference signal are rotated by different amounts on the chroma plane.

18. The system of claim 17, wherein the processor is configured to adjust the green color in the second image through a first correction signal that is finite in a quadrant of a Cb-Cr plane corresponding to the green color.

19. The system of claim 18, wherein the processor is configured to adjust the blue color in the second image through a second correction signal that is finite in at least a portion of at least one quadrant of the Cb-Cr plane corresponding to the blue color to shift the bright blue color towards the dark blue color.

20. The system of claim 19, wherein the processor is configured to adjust the tone of the red color in the first image through a third correction signal that is finite in at least a portion of a quadrant of the Cb-Cr plane corresponding to the red color.

* * * * *